Patented Jan. 15, 1946

2,392,972

UNITED STATES PATENT OFFICE 2,392,972

COATED PAPER

La Verne E. Cheyney, Akron, Ohio, assignor to Wingfoot Corporation, Wilmington, Del., a corporation of Delaware No Drawing. Application November 15, 1944, Serial No. 563,624

14 Claims. (Cl. 117—76)

This application relates to a new coated paper composition which is especially resistant to the transmission of water vapor. More particularly, the invention relates to a method of surfacing paper with vinylidene chloride-vinyl chloride copolymers of a preferred range of composition and to the products thereby produced.

Throughout this specification the expression "polymer of a monomeric substance containing vinyl chloride as its principal component" is used to define a class of resinous polymers including polyvinyl chloride and various copolymers of vinyl chloride and other monomers compatible therewith. The same class of polymers are also described as "high vinyl chloride polymers."

It is known that vinyl chloride resins, particularly polymers of monomeric substances containing vinyl chloride as the principal constituent, are useful as coating compositions. Such compositions, however, are not highly moisture-vapor-resistant, having a relatively high rate of transfer of water vapor. Other polymers having better moisture-vapor-resistance, such as the vinyl chloride-vinylidene chloride copolymers, possess low solution viscosity and tend to penetrate the surface of porous papers. This penetration produces a coating which is still porous and has a high rate of water vapor transfer, unless abnormal weights of coating are used. Accordingly, it is the purpose of this invention to provide a method of coating paper with resins to render the surface highly resistant to the passage of water vapor. A further purpose of this invention is to provide a sheet of paper with a coating of a resin consisting of a soluble copolymer of vinylidene chloride and vinyl chloride in a preferred range of composition.

I have discovered that, although copolymers of vinyl chloride and from 40 to 80 percent of vinylidene chloride cannot be used successfully to coat porous papers directly, it is possible to secure a firmly adherent surface layer thereof if the paper is preliminarily treated with polyvinyl chloride or a high vinyl chloride copolymer. In order to achieve the desired result, it is preferable to use a specific procedure whereby the outer resin coating is partially diffused into the inner coating and the paper base is at least partially impregnated with the resin of the inner coating.

Suitable materials for the outer coating are the soluble copolymers of vinylidene chloride and vinyl chloride, particularly the copolymers of 40 to 80 percent of vinylidene chloride. This copolymer should be soluble in aromatic hydrocarbons, such as benzene, toluene and xylene. The following copolymers are useful for the outer coating:

75% vinylidene chloride, 25% vinyl chloride.
65% vinylidene chloride, 35% vinyl chloride.
40% vinylidene chloride, 60% vinyl chloride.
Saran B-130 (vinylidene chloride-vinyl chloride copolymer produced by Dow Chemical Co.).

The inner coating or paper-impregnating composition may be any resin which is swelled but not dissolved by the aromatic hydrocarbon solvent in which the vinylidene chloride copolymer is dissolved. Especially valuable are the high vinyl chloride polymers of monomeric substances containing at least 70 percent of vinyl chloride. The following polymer compositions are useful:

Polyvinyl chloride.
Copolymer of 85% vinyl chloride and 15% vinylidene chloride.
Copolymer of 90% vinyl chloride and 10% vinyl acetate.
Copolymer of 80% vinyl chloride and 20% vinylidene chloride.
Copolymer of 80% vinyl chloride and 20% diethyl maleate.
Copolymer of 85% vinyl chloride and 15% ethyl acrylate.
Copolymer of 85% vinyl chloride and 15% diethyl fumarate.
Copolymer of 75% vinyl chloride and 25% vinyl acetate.

The new compositions may be prepared by first treating any porous or unglazed paper, for example kraft paper, with the high vinyl chloride polymer. This treatment may be effected by a solution of the polymer in a suitable solvent, such as ethylene dichloride or methyl ethyl ketone, or by conducting the treatment at temperatures and pressures at which the vinyl chloride polymer is fluid. The paper thus becomes surfaced with a thin adherent layer of the vinyl chloride polymer which, at least partially, has filled the interstices of the porous paper. The final coating operation is conducted by dissolving the vinylidene chloride copolymer in benzene or other aromatic hydrocarbon, and applying the solution to the paper which has been previously surfaced with the high vinyl chloride polymer or copolymer. The solution of the vinylidene chloride copolymer may be applied by spraying, by painting, or preferably, by dipping the pre-coated paper into a bath of the solution or by any other of the methods well known in the art. The solvent for the vinylidene chloride copolymer causes the precoating of vinyl chloride copolymer to swell as the solvent is absorbed therein. This solvent carries into the vinyl chloride copolymer a substantial proportion of the dissolved vinylidene chloride copolymer. After a period of time the paper is dried and the solvent thereby evaporated. The coated composition possesses an outer surface of water-vapor-resistant vinylidene chloride copolymer which gradually changes in composition towards the interior until at the paper surface there is very little or no vinylidene chloride copolymer. This structure assures a firmly adherent vinylidene chloride copolymer coating.

Example 1

A 30 pound per ream kraft paper was coated with a vinyl chloride-acetate copolymer of 95 percent vinyl chloride to yield a coating weight of 8.6 pounds per ream on one side of the paper only. The coating was applied from a seven percent solution of the resin in ethylene dichloride, maintained at 150° F. Water vapor transfer rate of the coated paper was 74.25 g./m²/24 hours at 100° F.

Example 2

By the method described in Example 1, another sample of the same paper was coated with a 5.0 pounds per ream coating of the same vinyl chloride-acetate copolymer. This was followed by a 2.5 pounds per ream coating of a copolymer of 60 percent vinylidene chloride and 40 percent vinyl chloride, applied from a 20 percent solution in benzene, maintained at 130° F. Although the total coating weight was less than in Example 1, the water vapor transfer rate was 22.4 g./m²/24 hours.

The new laminated composition is useful as a wrapping material and is especially adapted for the preservation of articles subject to deterioration in the presence of water or water vapors. In general, the materials may be used for any purpose for which resin sheets are generally suitable.

Although this invention is described with respect to specific examples, it is not intended that the details thereof shall be construed as limitations on the scope of the invention except as included in the following claims.

I claim:
1. A method of preparing a water-vapor-resistant surface on a porous paper which comprises coating the paper with a polymer of a monomeric substance containing at least 75 percent of vinyl chloride, said polymer being insoluble in an aromatic hydrocarbon but capable of being swelled by the contact with said hydrocarbon, treating the coated paper with a solution of a copolymer of from 40 to 80 percent vinylidene chloride and from 60 to 20 percent vinyl chloride dissolved in an aromatic hydrocarbon, and evaporating said aromatic hydrocarbon.

2. A method of preparing a water-vapor-resistant surface on a porous paper which comprises coating the paper with polyvinyl chloride, contacting the coated paper with a solution of a copolymer of from 40 to 80 percent of vinylidene chloride and 60 to 20 percent of vinyl chloride in a suitable solvent, said solvent being capable of swelling the polyvinyl chloride, removing said paper from contact with the solution of vinylidene chloride copolymer, and drying the paper by the evaporation of the solvent therein contained.

3. A method of preparing a resin coated paper composition which comprises coating a porous paper with a polymer of a monomeric substance containing at least 75 percent of vinyl chloride, contacting the coated paper with a solution of a copolymer of from 40 to 80 percent of vinylidene chloride and from 60 to 20 percent vinyl chloride in a suitable solvent, said solvent being capable of swelling the vinyl chloride polymer used as the base coat, removing said paper from contact with the solution of vinylidene chloride copolymer, and drying the coated paper by the evaporation of the solvent therein contained.

4. A method of preparing a water-vapor-resistant surface on a porous paper which comprises coating the paper with a polymer of a monomeric substance containing at least 75 percent of vinyl chloride, said polymer being insoluble in aromatic hydrocarbons and capable of being swelled by the contact with said hydrocarbons, treating the coated paper with a solution of a copolymer of from 50 to 70 percent of vinylidene chloride and 50 to 30 percent vinyl chloride dissolved in an aromatic hydrocarbon, and evaporating said aromatic hydrocarbon.

5. A method of preparing a resin-coated paper composition which comprises coating a porous paper with a polymer of a monomeric substance containing at least 75 percent of vinyl chloride, contacting the coated paper with a solution of a copolymer of from 50 to 70 percent of vinylidene chloride and from 50 to 30 percent of vinyl chloride in a suitable solvent, said solvent being capable of swelling the vinyl chloride polymer, removing said paper from contact with the solution of vinylidene chloride copolymer and drying the paper by the evaporation of the solvent therein contained.

6. A method of preparing a water-resistant surface on a porous paper which comprises treating the paper with a solution of a polymer of at least 75 percent of vinyl chloride, evaporating said solvent, treating the coated paper thus prepared with a solution of a copolymer of from 40 to 80 percent of vinylidene chloride and from 60 to 20 percent of vinyl chloride dissolved in an aromatic hydrocarbon, and evaporating said aromatic hydrocarbon.

7. A method of preparing a resin-coated paper composition which comprises treating a porous paper with a solution of a polymer of at least 75 percent of vinyl chloride, evaporating said solvent, treating the coated paper thus prepared with a solution of a copolymer of from 50 to 70 percent of vinylidene chloride and from 50 to 30 percent of vinyl chloride dissolved in a suitable solvent in which the vinyl chloride polymer used as the base coat is insoluble, said solvent being capable of swelling the vinyl chloride copolymer, removing said paper from contact with the solution of vinylidene chloride copolymer, and drying the coated sheet by the evaporation of the solvent therein contained.

8. A method of preparing a resin-coated paper composition which comprises dipping a porous paper into a solution of a polymer of at least 75 percent of vinyl chloride, removing said sheet from contact with the solution, drying the paper by the evaporation of the solvent, dipping the coated paper thus prepared into a solution of a copolymer of 40 to 80 percent of vinylidene chloride and 60 to 20 percent of vinyl chloride in a suitable solvent, said solvent being capable of swelling the vinyl chloride copolymer used as the base coat, removing the coated paper from contact with the solution of vinylidene chloride copolymer, and drying the coated paper by the evaporation of the solvent therein contained.

9. A method of preparing a resin-coated composition which comprises dipping a porous paper in a solution of a polymer of at least 75 percent of vinyl chloride, removing the paper from said solution, drying the paper by the evaporation of the solvent, dipping the coated paper into an aromatic hydrocarbon solution of a copolymer of from 50 to 70 percent of vinylidene chloride and from 50 to 30 percent of vinyl chloride, removing the said coated paper from contact with the solution, and drying the coated sheet by the evaporation of the solvent.

10. A coated paper comprising a base of a porous paper, a sub-surface coat of a polymer of at least 75 percent of vinyl chloride, said surface coat at least partially impregnating the porous paper, and a finish coat of a vinyl chloride-vinylidene chloride copolymer containing from 40 to 80 percent of vinylidene chloride, said finish coating being partially diffused into the sub-surface coating.

11. A coated paper comprising a base of porous paper, a sub-surface coat of polyvinyl chloride, and a finish coat of a copolymer of from 40 to 80 percent of vinylidene chloride and from 60 to 20 percent of vinyl chloride.

12. A coated paper comprising a base of porous paper, a sub-surface coat of a polymer of at least 75 percent of vinyl chloride, and a finish coat of a copolymer of from 40 to 80 percent of vinylidene chloride and from 60 to 20 percent vinyl chloride.

13. A coated paper comprising a base of porous paper, a sub-surface coat of a polymer of a monomeric substance containing at least 75 percent of vinyl chloride, said surface coat at least partially impregnating the porous paper, and a finish coat of a copolymer of from 50 to 70 percent of vinylidene chloride and from 50 to 30 percent of vinyl chloride, said finish coating being partially diffused into the sub-surface coating.

14. A coated paper comprising a base of porous paper, a sub-surface coat of a polymer of a monomeric substance containing at least 75 percent of vinyl chloride and a finish coat of a polymer of from 50 to 70 percent of vinylidene chloride and 50 to 30 percent of vinyl chloride.

LA VERNE E. CHEYNEY.